United States Patent
Stanfill

(10) Patent No.: US 11,916,759 B2
(45) Date of Patent: Feb. 27, 2024

(54) OPTIMIZING COMMUNICATION IN DISTRIBUTED COMPUTING NETWORK

(71) Applicant: Ab Initio Technology LLC, Lexington, MA (US)

(72) Inventor: Craig W. Stanfill, Lincoln, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 17/323,389

(22) Filed: May 18, 2021

(65) Prior Publication Data

US 2021/0367861 A1  Nov. 25, 2021

Related U.S. Application Data

(60) Provisional application No. 63/027,008, filed on May 19, 2020.

(51) Int. Cl.
*H04L 41/5022* (2022.01)
*H04L 41/5003* (2022.01)
*H04L 43/0888* (2022.01)

(52) U.S. Cl.
CPC ...... *H04L 41/5022* (2013.01); *H04L 41/5003* (2013.01); *H04L 43/0888* (2013.01)

(58) Field of Classification Search
CPC ............. H04L 41/5022; H04L 41/5003; H04L 43/0888
See application file for complete search history.

(56) References Cited

U.S. PATENT DOCUMENTS

| | | | | |
|---|---|---|---|---|
| 5,367,523 A | * | 11/1994 | Chang | H04L 47/10 370/235 |
| 9,749,174 B1 | * | 8/2017 | Goff | H04L 67/1004 |
| 10,623,281 B1 | * | 4/2020 | Zhao | H04L 41/0681 |

(Continued)

OTHER PUBLICATIONS

International Search Report and Written Opinion, International Application No. PCT/US2021/032919, dated Aug. 6, 2021 (16 pages).

(Continued)

*Primary Examiner* — Thu V Nguyen
*Assistant Examiner* — Angela M Widhalm De Rodriguez
(74) *Attorney, Agent, or Firm* — Occhiuti & Rohlicek LLP

(57) ABSTRACT

A computing system includes a distributed computing cluster including a plurality of computing nodes interconnected by an interconnect network over which the computing nodes of the plurality of computing nodes communicate with each other by passing messages. The computing nodes are configured with a first parameter governing transmissions of messages by the computing nodes over the interconnect network. The computing nodes are configured to accumulate messages for transmission as a group of messages according to the first parameter, and the computing system is configured to limit injections of computing requests into the distributed computing cluster according to a second parameter. A controller is configured to receive at least one predetermined service level requirement and to control a value of the second parameter and a value of the first parameter to control a computational throughput of the distributed computing cluster while complying with the at least one service level requirement.

21 Claims, 13 Drawing Sheets

(56) References Cited

U.S. PATENT DOCUMENTS

| | | | | |
|---|---|---|---|---|
| 2005/0063307 A1* | 3/2005 | Samuels | ............. | H04L 67/2876 370/235 |
| 2008/0239953 A1* | 10/2008 | Bai | ........................ | H04L 47/11 370/231 |
| 2011/0219287 A1* | 9/2011 | Srinivas | .................. | G06F 11/10 714/752 |
| 2014/0143300 A1* | 5/2014 | Karlsson | ............... | H04L 43/026 709/203 |
| 2015/0205637 A1* | 7/2015 | Lee | ........................ | G06N 20/10 718/105 |
| 2021/0227042 A1* | 7/2021 | Sawant | .................. | H04L 45/16 |

OTHER PUBLICATIONS

Nagle's Algorithm, [retrieved from the internet (Aug. 19, 2021):https://en.wikipedia.org/wiki/Nagle%27s_algorithm].

* cited by examiner

```
1  while(T)
2  {
3      adjust(d);
4      if(R_out == R_in AND SLA-Latency >0){
5          R_in = R_in + δ;
6      }
7      else{
8          R_in = R_in - δ;
9      }
10 }
11
12
13 adjust(d)
14 {
15     modify d to reach d*, the lowest value of d where further increasing d does not increase R_out
16 }
```

FIG. 3

OPTIMIZING COMMUNICATION IN DISTRIBUTED COMPUTING NETWORK

CROSS-REFERENCE TO RELATED APPLICATIONS

This application claims the benefit of U.S. Provisional Application No. 63/027,008 filed May 19, 2020, the content of which is incorporated herein in its entirety.

BACKGROUND

This description relates to the management and optimization of communication in a distributed computing network.

Distributed computing systems use a cluster of computing nodes working together in a coordinated fashion to solve computational problems. The computing nodes are typically located on separate networked computers that communicate over an interconnect. In operation, a computational problem is divided into multiple tasks, each of which is solved by (a separate) one or more of the computing nodes in the distributed computing system. The solution to the computational problem is coordinated by message passing between the tasks (and computing nodes) over the interconnect. Messages are passed over the interconnect for a number of reasons, including to provide the result of computations to downstream tasks and to replicate data.

SUMMARY

In a distributed computing system, when a state of a node in the network changes (e.g., instructions are received by the node from an outside source or a result of a task is generated by the node), other computing nodes in the distributed computing system may be informed of the change. To inform the other computing nodes of changes, messages including information related to network transactions are communicated between the nodes. As communication of messages between the computing nodes can be frequent, it is desirable to maintain efficiency and high throughput in communicating the messages.

One strategy for achieving efficiency and high throughput includes bundling together several messages from different transactions and sending the bundle of messages in a single network transaction. The bundling strategy increases throughput over the interconnect because the CPU cost and network overhead of sending a single message is largely fixed and the CPU cost of sending subsequent messages in that same transaction is negligible relative to the CPU cost of sending the single message. But the bundling strategy may also cause an undesirably large network latency due to the system waiting for messages to fill a bundle before transmitting the bundle. Another parameter that affects throughput and latency in a distributed computing system is a rate of injection of requests into the distributed computing system. For example, a too high rate of injection may cause congestion and thereby reduce efficiency and/or increase latency. Aspects described herein are related to a strategy that controls the above-described parameters of a distributed computing system to balance latency and throughput in order to achieve a desirable overall network performance.

In a general aspect, a computing system includes a distributed computing cluster including a plurality of computing nodes interconnected by an interconnect network over which the computing nodes of the plurality of computing nodes communicate with each other by passing messages. Each of at least some of the computing nodes are configured with a first parameter governing transmissions of messages by the computing node over the interconnect network. The at least some computing nodes are configured to accumulate messages for transmission as a group of messages according to the first parameter, and the computing system is configured to limit injections of computing requests into the distributed computing cluster according to a second parameter. The computing system also includes a controller configured to receive at least one predetermined service level requirement and to control a value of the second parameter and a value of the first parameter to control a computational throughput of the distributed computing cluster while complying with the at least one service level requirement.

Aspects may include one or more of the following features.

The computing system may include one or more interface components, each configured to receive input data, inject requests into the distributed computing cluster for processing the input data, receive processing results from the distributed computing cluster, and generate output data from the processing results. The interface component may be configured to limit a rate of injection of requests into the distributed computing system according to the second parameter. At least some of the one or more interface components may execute on a client system separate from systems on which the distributed computing cluster executes. At least some of the received input data may be associated with priority levels, and the one or more interface components may be configured to manage injection of the input data into the distributed data cluster according to the priority levels.

The distributed computing cluster may include a rate limiter configured to limit a rate of injection of requests into the distributed computing system according to the second parameter. Each service level requirement of the one or more service level requirements may specify a maximum time duration in which the distributed computing cluster must fulfill or respond to a request. The computing system may include a monitor configured to observe a computational throughput of the distributed computing cluster and a processing latency of the distributed computing system. The observed computational throughput may be measured by monitoring a CPU load of one or more computing nodes.

The observed computational throughput may be inferred from a number of messages that are present in the interconnect network. The observed latency may be measured at a service request level. The observed latency may be measured by determining as a time difference between injecting a request into the distributed computing cluster and receiving a response to the request from the distributed computing cluster. Requests injected into the distributed computing cluster and results output by the distributed computing cluster may pass through the monitor.

The controller may be configured to process the observed computational throughput of the distributed computing cluster and the observed processing latency to adjust the value of the second parameter and the value of the first parameter. The controller may repeatedly process the observed computational throughput of the distributed computing cluster and the observed processing latency to adjust the value of the second parameter and the value of the first parameter while the distributed computing cluster is processing requests. The controller may implement a feedback loop to process the observed computational throughput of the distributed computing cluster and the observed processing latency to adjust the value of the second parameter and the value of the first parameter. The controller may use an optimization algorithm to control the value of the first parameter.

The first parameter may include a delay parameter governing a minimum time interval between transmission of messages by the computing node over the interconnect network. The at least some computing nodes may be configured to accumulate messages for transmission as a group of messages during the minimum time interval. The second parameter may include a rate of input parameter configured to limit a rate of the injection s of computing requests into the distributed computing cluster. Controlling the computational throughput of the distributed computing cluster while complying with the at least one service level requirements may include the maximizing a computational throughput of the distributed computing cluster without violating any of the at least one service level requirements. The first parameter may govern a number of messages accumulated between transmissions of messages by the computing node over the interconnect network.

In another general aspect, a method includes limiting injections of computing requests into a distributed computing cluster according to a second parameter, wherein the distributed computing system includes a plurality of computing nodes interconnected by an interconnect network over which the computing nodes of the plurality of computing nodes communicate with each other by passing messages. Each of at least some of the computing nodes are configured with a first parameter governing transmissions of messages by the computing node over the interconnect network. The method also includes accumulating, at the at least some computing nodes, messages for transmission as a group of messages according to the first parameter, receiving, at a controller, at least one predetermined service level requirement, and controlling, using the controller, a value of the second parameter and a value of the first parameter to maximize a computational throughput of the distributed computing cluster while complying with the at least one service level requirement.

In another general aspect, software stored in a non-transitory form on a computer-readable medium includes instructions for causing a computing system to limit a rate of injection of computing requests into a distributed computing cluster according to a second parameter. The distributed computing system includes a plurality of computing nodes interconnected by an interconnect network over which the computing nodes of the plurality of computing nodes communicate with each other by passing messages. Each of at least some of the computing nodes are configured with a first parameter governing transmissions of messages by the computing node over the interconnect network. The instructions also cause the computing system to accumulate, at the at least some computing nodes, messages for transmission as a group of messages according to the first parameter, receive, at a controller, at least one predetermined service level requirement, and control, using the controller, a value of the second parameter and a value of the first parameter to maximize a computational throughput of the distributed computing cluster while complying with the at least one service level requirement.

In another general aspect, a computing system includes means for limiting a rate of injection of computing requests into a distributed computing cluster according to a second parameter. The distributed computing system includes a plurality of computing nodes interconnected by an interconnect network over which the computing nodes of the plurality of computing nodes communicate with each other by passing messages, each of at least some of the computing nodes being configured with a first parameter governing a transmissions of messages by the computing node over the interconnect network. The computing system also includes means for accumulating, at the at least some computing nodes, messages for transmission as a group of messages according to the first parameter, means for receiving, at a controller, at least one predetermined service level agreement, and means for controlling, using the controller, a value of the second parameter and a value of the first parameter to maximize a computational throughput of the distributed computing cluster while complying with the at least one service level requirement.

Aspects can include one or more of the following advantages.

Distributed computing clusters including many interconnected computing nodes are capable of receiving and processing substantial amounts of information, and subsequently communicating processed information outside of the network. Typically, while work entering a distributed computing cluster can be designated as "high-priority" or "low-priority", there is rarely a notion of "priority" inside the computing cluster, where all information is processed equally. The notion of "priority" as it relates to work entering a distributed computing cluster pertains to a desired service level agreement (SLA). However, meeting an SLA requires not only controlling work entering the system based on its priority, but also controlling the throughput and latency of the work inside the computing cluster. While it is relatively straightforward to control one of either throughput or latency, controlling both to meet an SLA can be challenging.

One difficulty in controlling both throughput and latency arises because there is no way to know a priori how much work is going to be entering the system at a given time. Having the computing cluster adapt to how much work enters it at any given time eliminates the possibility of work flooding the system, thereby allowing the computing cluster to not only control the internal throughput and latency of work being processed in the system, but also to meet the SLA of that work—simply put, if the system would not be able to meet a particular SLA of some piece of incoming work, then it is not accepted by the computing cluster.

In terms of processing work inside a distributed computing cluster, the system's ability to meet an SLA can be hindered by a mismanagement of balancing throughput and latency of work inside the system. In practice, one cannot always achieve both high throughput and low latency at once—a straightforward approach to achieving high throughput inside a distributed computing cluster involves collecting a large number of messages in the buffer of a computing node before communicating the contents of that buffer to other nodes. The issue then arises that while this achieves high throughput, it presumably takes a long time to fill the buffer, therefore resulting in high latency. Similarly, one could configure a computing cluster to transmit messages as soon as they are received so as to achieve low latency, however this would also produce low throughput. Aspects described herein are configured to resolve the problem of balancing desirable throughput and latency in such a way that an SLA required for the work is met.

In some aspects, the optimized communication in a distributed computing network implements a "call cluster component" which acts as a gatekeeper at the entry points for work into the distributed computing cluster. Aspects use the call cluster components to prevent the entry of work into the system if the SLA associated with that work cannot be met. Furthermore, in some examples, the call cluster components advantageously exhibit a preference for allowing high-priority work into the system over low-priority work. Given that there is no notion of "priority" on work once inside the system, a way for high-priority work to miss its SLA is if the system becomes flooded with low-priority work. By giving preference to high-priority work when entering the system, it is more likely that the system will achieve the SLA for that work.

Certain aspects advantageously implement an internal clock that is synchronized across all computing nodes in the distributed computing cluster. To achieve a desirable throughput and latency for work inside the system with respect to an SLA, the system instructs its computing nodes to communicate their contents to other computing nodes after a certain time interval, as indicated by the internal clock. In doing so, the system is advantageously able to achieve a desirable throughput while ensuring that its latency never surpasses a predetermined time interval.

Other features and advantages of the invention will become apparent from the following description, and from the claims.

DESCRIPTION OF DRAWINGS

FIG. 3 is an example of a control algorithm implemented by the controller.

DESCRIPTION

Figure 1:
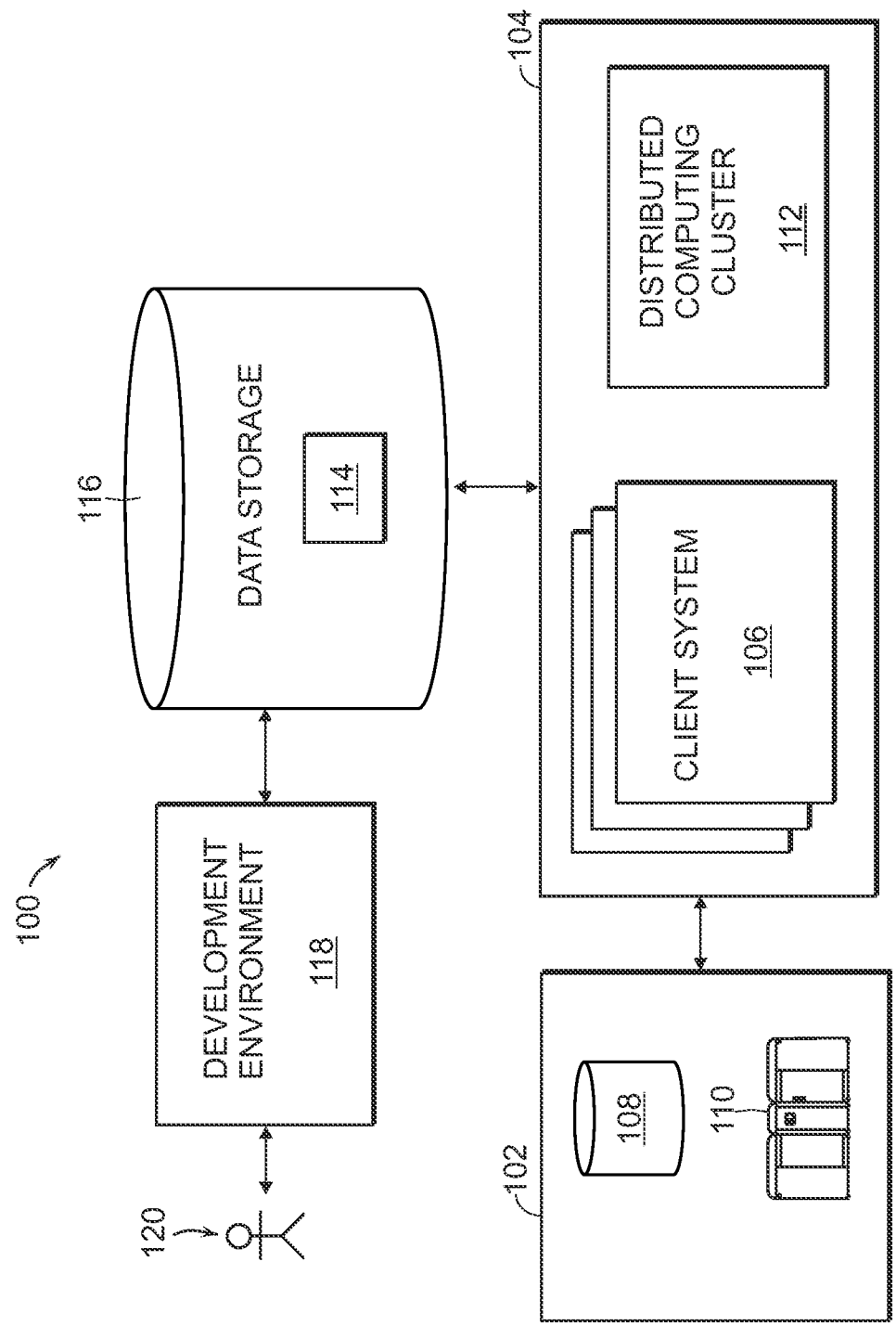
FIG. 1 is an exemplary data processing system.

FIG. 1 shows an example of a data processing system 100 in which a communication optimization technique can be used. The system 100 includes a data source 102 that may include one or more sources of data such as storage devices or connections to online data streams, each of which may store or provide data in any of a variety of formats (e.g., database tables, spreadsheet files, flat text files, or a native format used by a mainframe).

An execution environment 104 includes a distributed computing cluster 112 (sometimes referred to as an "active data cluster") that is usable by one or more client systems 106 to perform computation tasks as is described in greater detail below. One example of a distributed computing cluster is the distributed computing cluster described in U.S. patent application Ser. No. 16/175,133, which is incorporated herein by reference. The execution environment 104 may be hosted, for example, on one or more general-purpose computers under the control of a suitable operating system, such as a version of the UNIX operating system. For example, the execution environment 104 can include a multiple-node parallel computing environment including a configuration of computer systems using multiple central processing units (CPUs) or processor cores, either local (e.g., multiprocessor systems such as symmetric multi-processing (SMP) computers), or locally distributed (e.g., multiple processors coupled as clusters or massively parallel processing (MPP) systems, or remote, or remotely distributed (e.g., multiple processors coupled via a local area network (LAN) and/or wide-area network (WAN)), or any combination thereof.

In some examples, the execution environment 104 reads data from the data source 102 and stores results back into the data source 102 or provides results to other, downstream systems for further processing. Storage devices providing the data source 102 may be local to the execution environment 104, for example, being stored on a storage medium connected to a computer hosting the execution environment 104 (e.g., hard drive 108), or may be remote to the execution environment 104, for example, being hosted on a remote system (e.g., mainframe 110) in communication with a computer hosting the execution environment 104, over a remote connection (e.g., provided by a cloud computing infrastructure).

The data storage system 116 is also accessible to a development environment 118 in which a developer 120 is able to specify computer programs for execution in the execution environment (e.g., by the distributed computing cluster 112 via the one or more client systems 106). The development environment 118 is, in some implementations, a system for developing applications as dataflow graphs that include vertices (representing data processing components or datasets) connected by directed links (representing flows of work elements, i.e., data) between the vertices. For example, such an environment is described in more detail in U.S. Publication No. 2007/0011668, titled "Managing Parameters for Graph-Based Applications," incorporated herein by reference. A system for executing such graph-based computations is described in U.S. Pat. No. 5,966,072, titled "EXECUTING COMPUTATIONS EXPRESSED AS GRAPHS," incorporated herein by reference. Dataflow graphs made in accordance with this system provide methods for getting information into and out of individual processes represented by graph components, for moving information between the processes, and for defining a running order for the processes. This system includes algorithms that choose interprocess communication methods from any available methods (for example, communication paths according to the links of the graph can use TCP/IP or UNIX domain sockets, or use shared memory to pass data between the processes).

In some examples, the data source 102 maintains data in any number of different forms of database systems. The data may be organized as records having values for respective fields (also called "attributes" or "columns"), including possibly null values. When first reading data from a data source, the execution module 104 typically starts with some initial format information about records in that data source. In some circumstances, the record structure of the data source may not be known initially and may instead be determined after analysis of the data source or the data. The initial information about records can include, for example, the number of bits that represent a distinct value, the order of fields within a record, and the type of value (e.g., string, signed/unsigned integer) represented by the bits.

1 Execution Environment Overview

Figure 2:
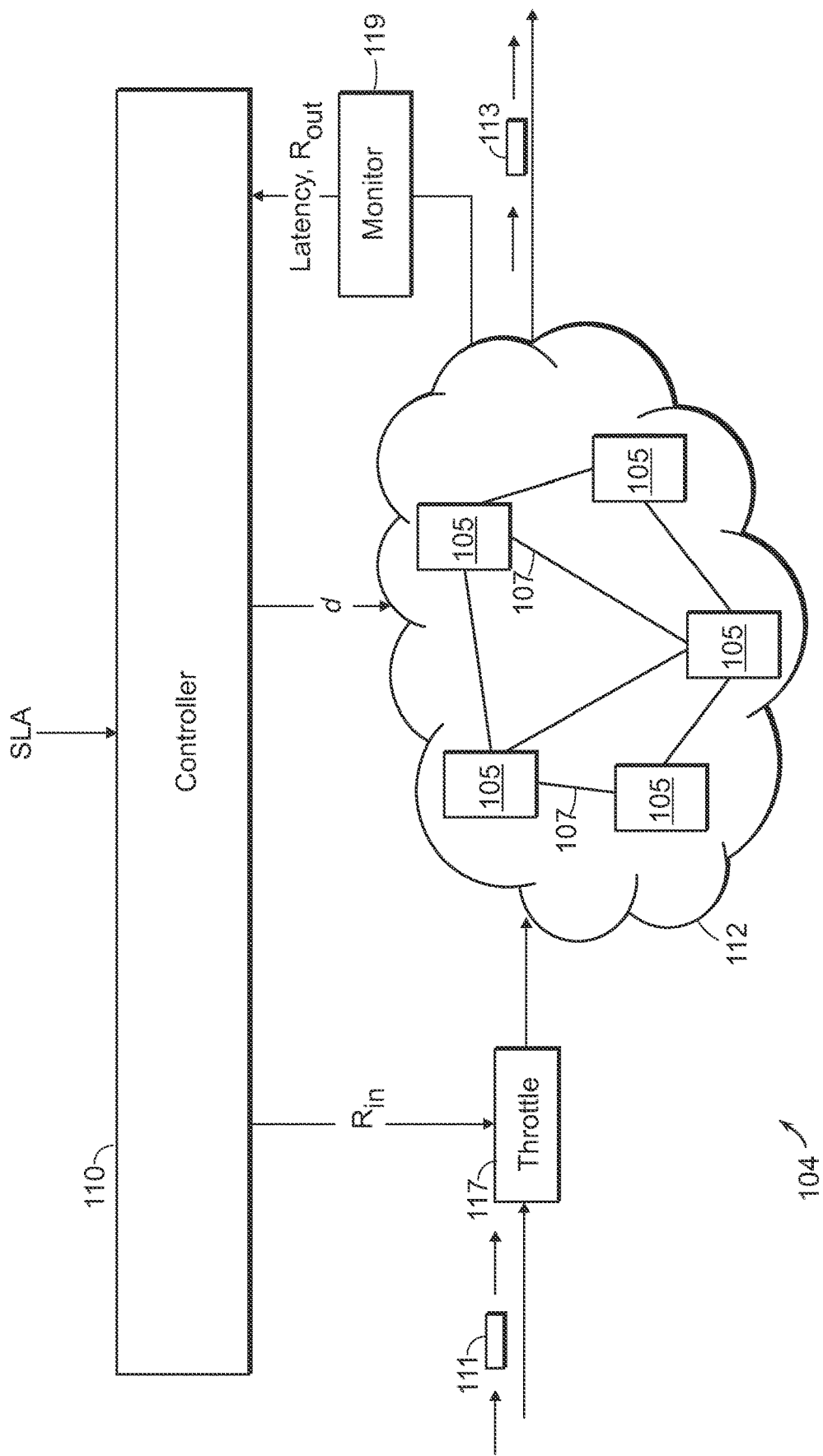
FIG. 2 is a depiction of an execution environment including a distributed computing cluster and a controller.

Referring to FIG. 2, a general overview of one example of the execution environment 104 includes the distributed computing cluster 112, a controller 110, a throttle 117, and a monitor 119. Very generally, the controller 110 and the distributed computing cluster 112 operate in a feedback loop to process a stream of input computing requests 111 provided by an upstream component (e.g., a "call cluster component" or "interface component," not shown) for injection into the cluster 112 and generate a stream of output data elements 113, which may be responses generated by the nodes 105 of the distributed computing cluster 112 in response to the computing requests 111 injected into the distributed computing cluster 112, in a way that maximizes computational throughput of the distributed computing cluster 112 while complying with any service level agreements or requirements associated with the distributed computing cluster 112.

In some examples, the controller 110 receives information characterizing a processing Latency and a rate of output, $R_{out}$ associated with the distributed computing cluster 112 from the monitor 119. The controller 110 uses the processing Latency and the rate of output, $R_{out}$ to determine a communication delay, d (sometimes referred to as a "first parameter") of messages transmitted within the distributed computing cluster 112 and a rate of injection of requests, $R_{in}$ (sometimes referred to as a "second parameter") into the distributed computing cluster 112. The rate of output may be a rate at which the cluster 112 outputs output data elements 113, which may be responses by the nodes 105 to the injected requests 111. The computational throughput of the cluster 112 may be observed by measuring, by the monitor 119, the rate of output $R_{out}$. The communication delay, d is provided to the distributed computing cluster 112 and is used to configure computing nodes 105 in the distributed computing cluster, as is described in greater detail below. The rate of injection of requests, $R_{in}$ is provided to the throttle 117 and is used to limit rate of injection of new requests into the distributed computing cluster 112.

In some examples, the input requests 111 include requests for processing data according to a procedure defined in a component external to the distributed computing cluster 112 (e.g., the call cluster component). The distributed computing cluster 112 processes the input requests 111 and provides results 113 (responses by nodes 105 to the injected computing requests 111) of the processing to the component external to the distributed computing cluster 112 (e.g., back to the call cluster component).

The throttle 117 is configured to limit a rate of injection of requests, $R_{in}$ to the distributed computing cluster 112. Very generally, the rate of injection of requests parameter is adjustable to ensure that requests are not injected into the distributed computing cluster 112 if those requests are unlikely to be completed within an amount of time specified by an SLA associated with the requests.

2 Distributed Computing Cluster

The distributed computing cluster 112 includes a number of computing nodes 105 connected to one another by an interconnection network 107 (or simply an "interconnect"). The interconnect 107 facilitates the communication of data between computing nodes 105 for processing data in a distributed manner. For example, the interconnect 107 includes an Internet protocol (IP)-based and/or Ethernet based network. Very generally, processing requests are injected into the distributed computing cluster 112 by one or more external components (not shown). The distributed computing cluster 112 processes the requests using the computing nodes 105 and the interconnection network 107 to generate the result data (e.g., responses by nodes 105 to the injected computing request) that is provided back to the external component.

In the course of processing requests, messages are frequently passed between the computation nodes 105 via the interconnect 107. The communication delay, d indicates how long the computing nodes 105 in the distributed computing cluster 112 wait between transmissions of messages to one another over the interconnect 107. The larger values of the communication delay cause the computing nodes 105 to wait a longer duration of time between transmissions. While the computing nodes 105 are waiting, they accumulate a group of messages for later transmission (e.g., in a single network package). So, larger values of the communication delay are associated with more messages being sent per transmission, resulting in greater throughput for the distributed computing cluster 112 (i.e., due to a reduction in network overhead associated with packet formation). But waiting for a long time duration also causes greater computing latency. Similarly, smaller values of the communication delay, d are associated with lesser throughput for the distributed computing cluster (i.e., due to increased network overhead associated with an increased number of packets being formed) but also with lesser computing latency.

3 Controller

As is mentioned above, the controller 110 implements a feedback control mechanism to maximize throughput in the distributed computing cluster 112 while ensuring compliance with service level agreements (SLAB) or other promises associated with the requests. The controller 110 uses a monitor 119 to monitor a processing Latency and a rate of output, $R_{out}$ associated with the distributed computing cluster 112. The controller 110 receives the Latency, the rate of output, $R_{out}$, and a service level agreement, SLA as input and processes those inputs to determine the input rate, $R_{in}$ and the communication delay, d for the distributed computing cluster 112.

The input rate, $R_{in}$ determined by the controller 110 is provided to the throttle 117 which maintains the rate of injection of requests 111 into the distributed computing cluster 112 at $R_{in}$. The communication delay, d determined by the controller 110 is provided to the distributed computing cluster 112 which maintains the time interval between transmissions of messages over the interconnect 107 of the distributed computing cluster 112 according to the communication delay, d.

3.1 Control Algorithm

Referring to FIG. 3, one example of a control algorithm implemented by the controller 110 begins at Line 1 by launching a while loop. On Line 3, a first operation of the procedure implemented in the while loop calls an adjust(d) function. The adjust(d) function, defined in Lines 13-16, modifies the value of the communication delay, d while monitoring the rate of output $R_{out}$ with the goal of reaching a value d* that is the lowest value of d where further increasing d does not increase $R_{out}$.

After the adjust(d) function returns, the algorithm implemented by the controller 110 proceeds to Line 4 where a test is performed to determine whether the rate of output, $R_{out}$ from the distributed computing cluster is equal to the rate of injection of requests, $R_{in}$ into the distributed computing cluster (i.e., does the distributed computing cluster currently have sufficient throughput to keep up?) AND if the difference between the SLA and the Latency is greater than zero (i.e., is the distributed computing cluster exceeding the SLA?).

At Line 5 of the algorithm, if the conditions set forth in Line 4 are met, the controller 110 increases the rate of injection of requests, $R_{in}$ by an amount, δ. At line 6 of the algorithm, if one or more of the conditions set forth in Line 4 of the algorithm are not satisfied, the controller 110 decreases the rate of injection of requests, $R_{in}$ by an amount, δ. That is, if the distributed computing cluster 112 is currently keeping up and exceeding the SLA, then the algorithm tries to increase the input rate, $R_{in}$. Otherwise, if the distributed computing cluster 112 is either failing to keep up with its processing load or is failing to meet the SLA, the controller 110 decreases the input rate, $R_{in}$.

The loop then repeats with the version of $R_{in}$ that was updated in the previous iteration of the loop. The adjust(d) function call in the current iteration of the loop modifies d to reach the lowest value of d where further increasing d does not increase $R_{out}$ for the updated version of $R_{in}$. If the adjust(d) function results in a value of d that causes $R_{out}$ to be equal to the updated value of $R_{in}$ AND causes the difference between the SLA and the Latency to be greater than zero, then the algorithm again increases $R_{in}$. Otherwise, the algorithm reduces $R_{in}$.

By monitoring the Latency and throughput of the distributed computing cluster 112, the algorithm of FIG. 3 maximizes throughput in the distributed computing cluster 112 while ensuring that no service level agreement (SLA) or other promises associated with the requests is violated.

4 Example 1

Referring to FIGS. 4-9, a first exemplary operation of the execution module 104 illustrates control of the distributed computing cluster 112 by the controller 110.

Figure 4:
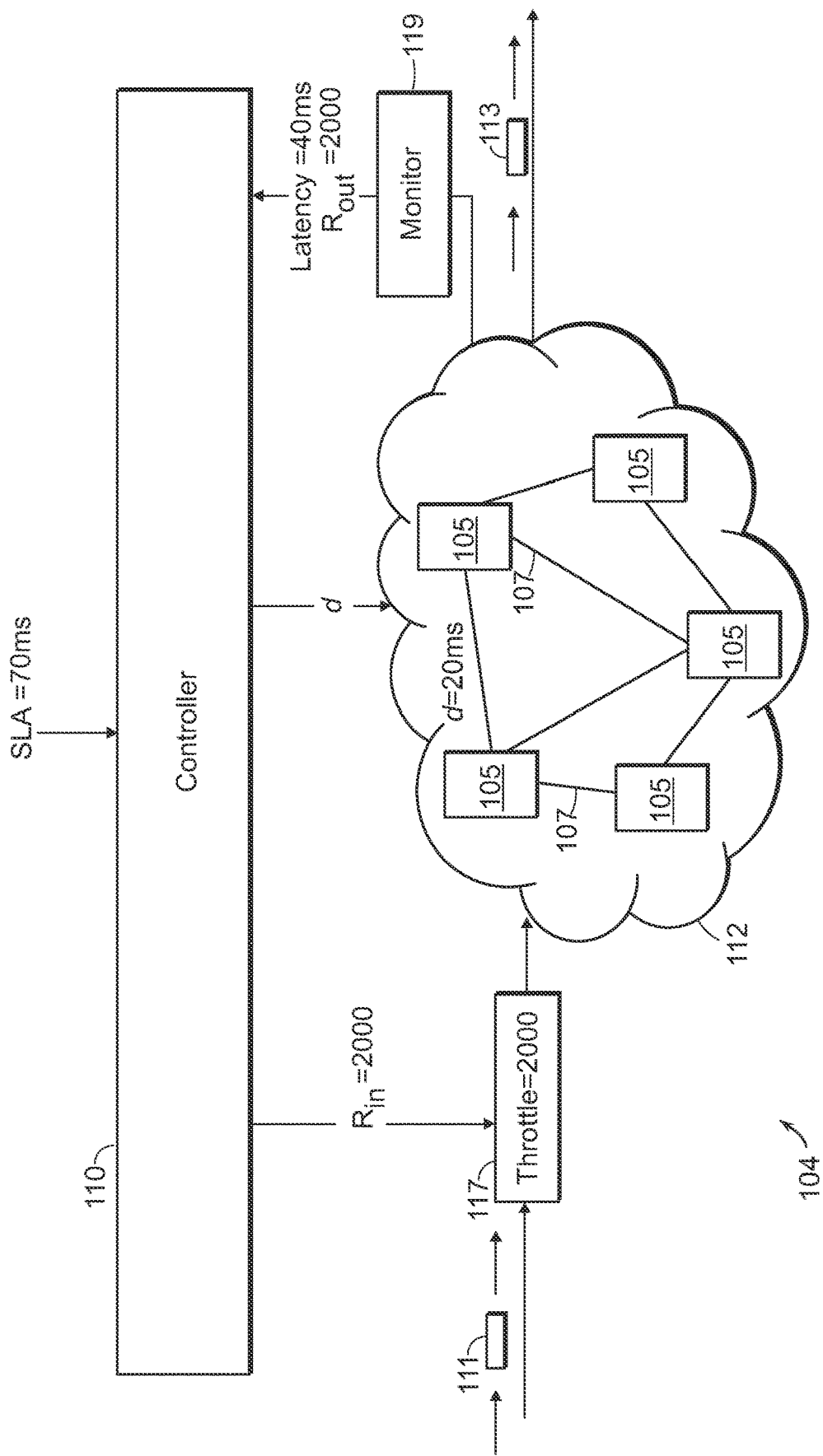
FIG. 4 is an initial state of the execution environment of FIG. 2 in a first example of operation of the execution environment.

Referring to FIG. 4, in an initial state, the rate of injection of requests to the distributed computing cluster 112, $R_{in}$ equals 2000 (e.g., messages/second) and the rate of output of the distributed computing cluster 112, $R_{out}$ equals 2000 (e.g., messages/second). $R_{in}$ and $R_{out}$ being equal indicates that the distributed computing cluster 112 has sufficient throughput to keep up with the rate of injection of requests, $R_{in}$. The monitored Latency of the distributed computing cluster 112 is 40 ms and the communication delay, d is equal to 20 ms. The controller 110 must maintain a 70 ms SLA for the requests 111.

Figure 5:
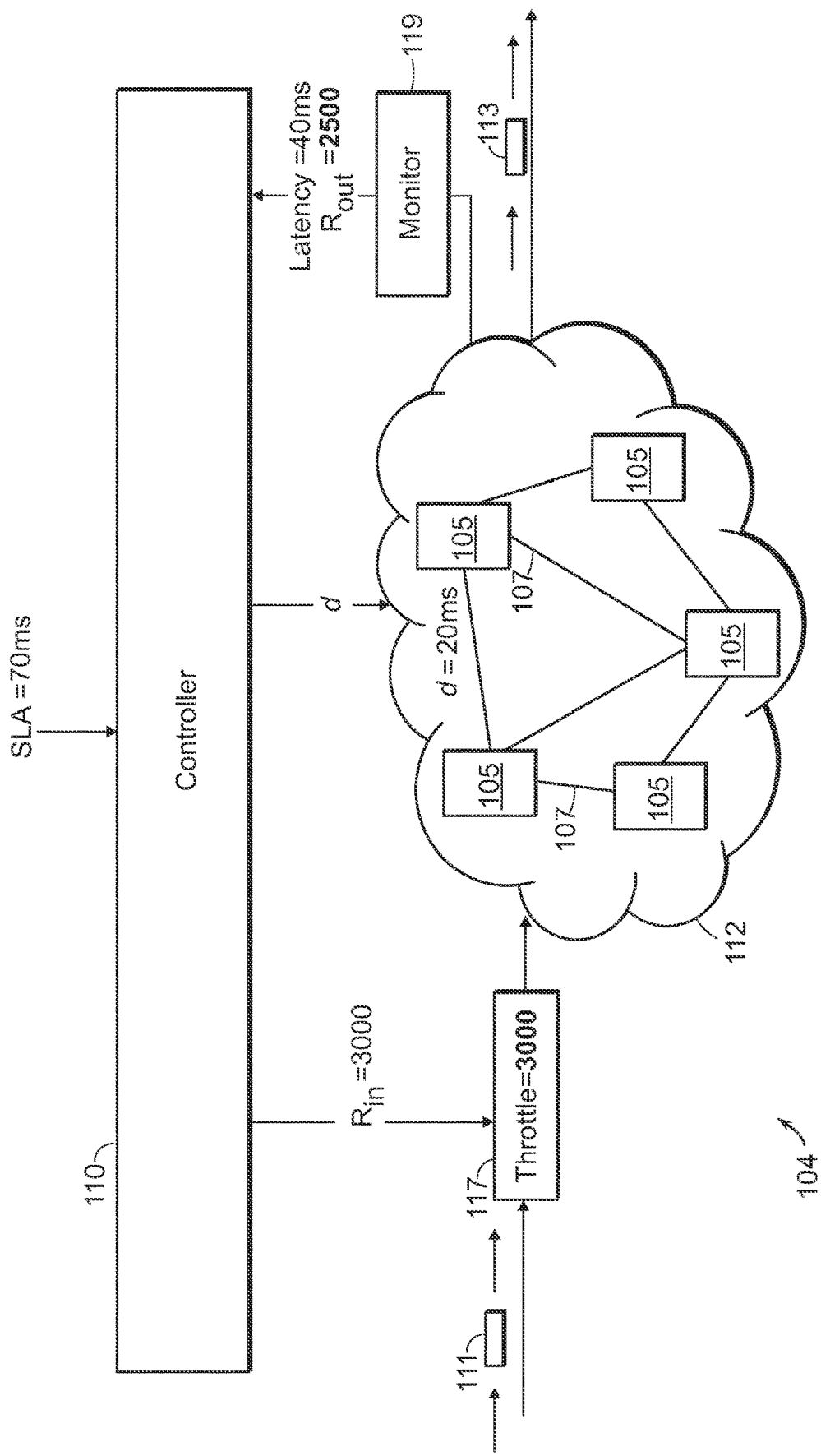
FIG. 5 is a first step in the first example of operation of the execution environment of FIG. 2.

Referring to FIG. 5, in a first iteration of the control algorithm, the controller 110 executes the adjust(d) function at Line 2 of the control algorithm and d is determined to already be at a lowest value where further increasing d does not increase $R_{out}$. The controller 110 then proceeds to Line 4 of the control algorithm where it determines that $R_{out}$ equals $R_{in}$ (i.e., 2000=2000) and the Latency is less than the SLA (i.e., 40 ms<70 ms). Because the conditions of Line 4 are satisfied, the controller 110 proceeds to Line 5 of the control algorithm and increases $R_{in}$ from 2000 to 3000. The increase of $R_{in}$ causes $R_{out}$ to increase to 2500 (i.e., the current configuration of the distributed computing cluster 112 does not have sufficient throughput to keep up with the increased rate of injection of requests, $R_{in}$).

Figure 6:
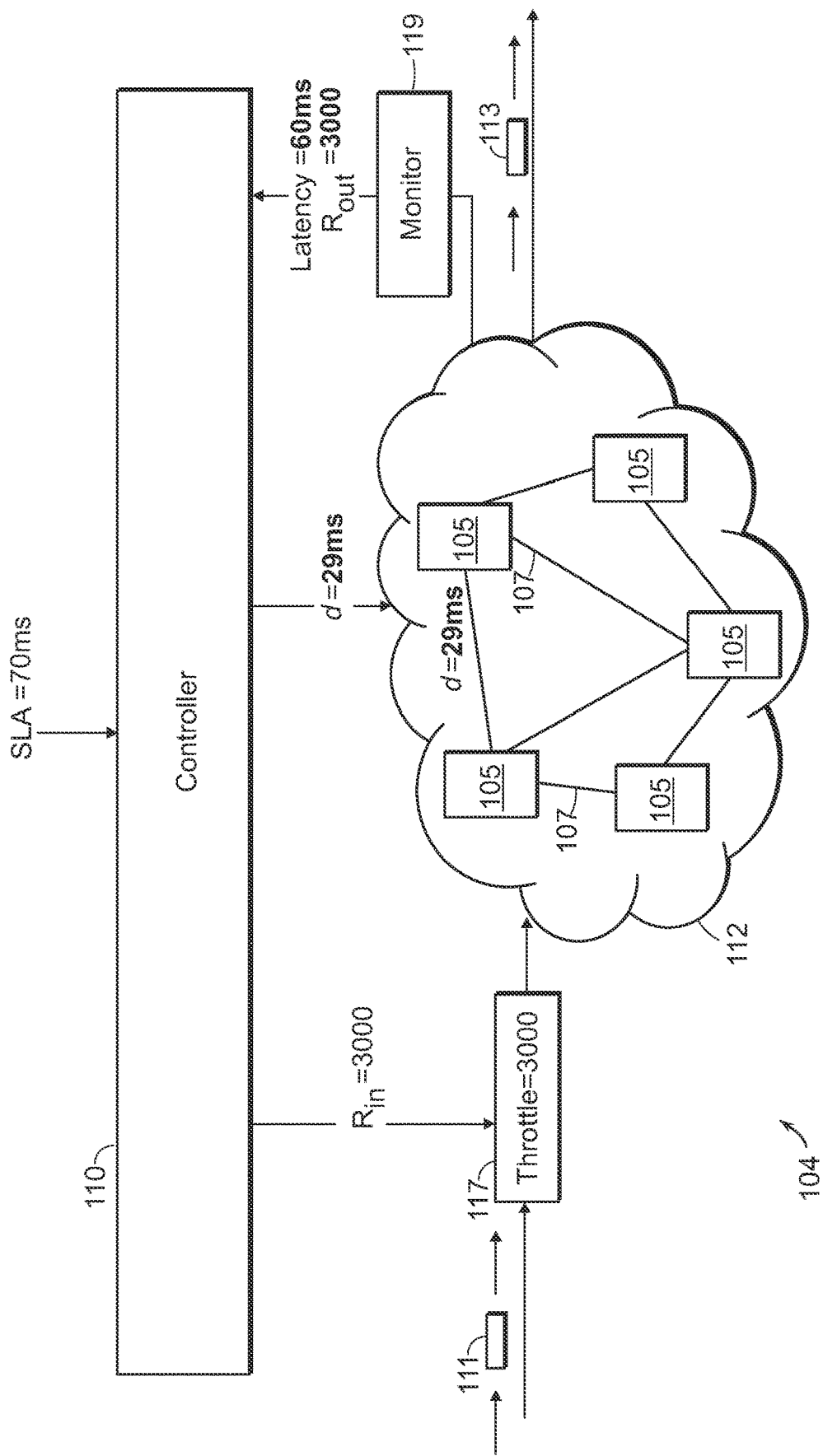
FIG. 6 is a second step in the first example of operation of the execution environment of FIG. 2.

Referring to FIG. 6, in a second iteration of the control algorithm, the controller 110 executes the adjust(d) function at Line 2 of the control algorithm and increases d to 29 ms, which results in an increase of $R_{out}$ to 3000. After the increase of d, the distributed computing cluster 112 is configured to have sufficient throughput to keep up with the increased rate of injection of requests, $R_{in}$. The increase of d also causes an increase in the Latency of the distributed computing cluster to 60 ms.

Figure 7:
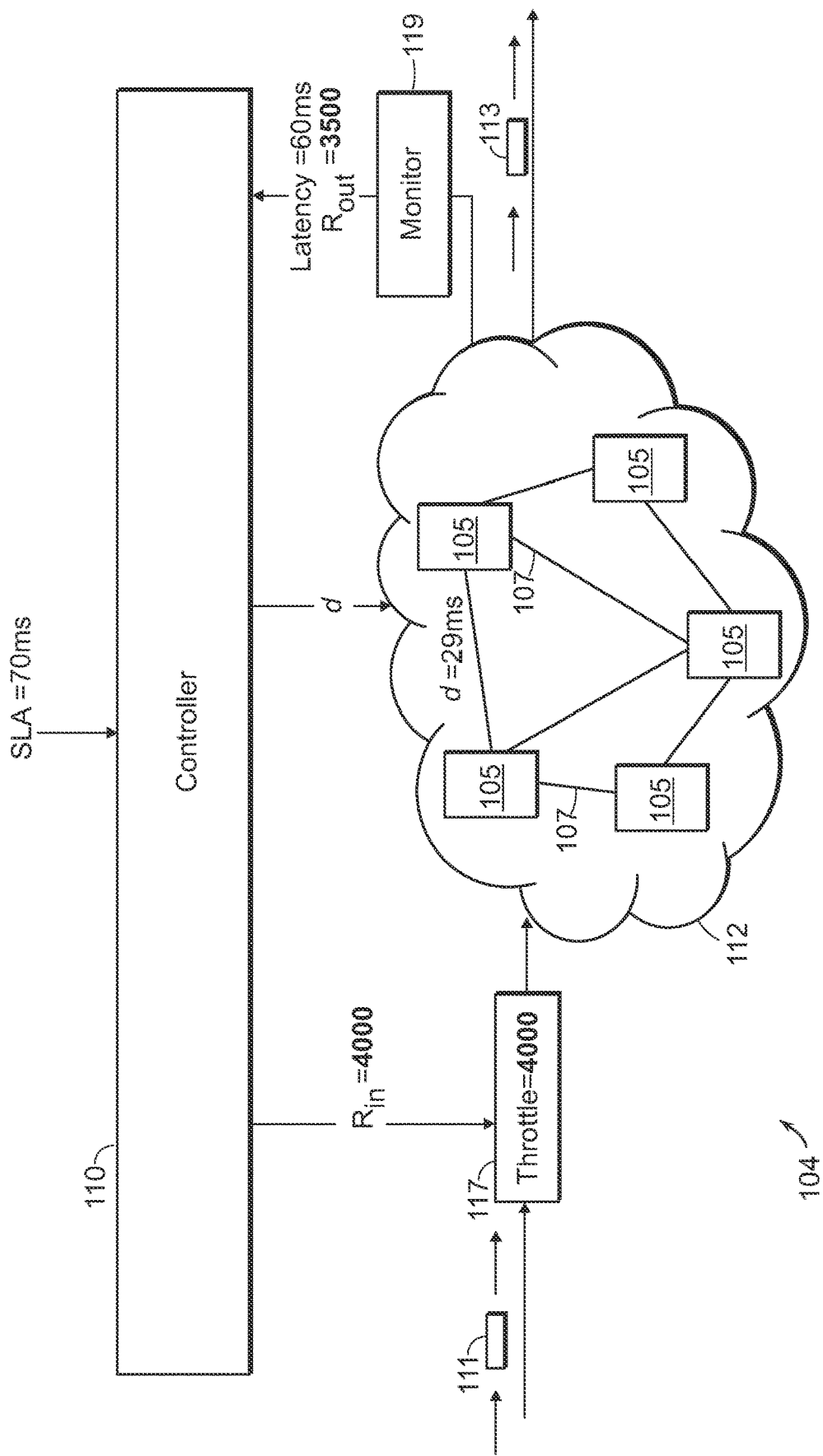
FIG. 7 is a third step in the first example of operation of the execution environment of FIG. 2.

Referring to FIG. 7, the second iteration of the control algorithm proceeds to Line 4 of the control algorithm where it determines that $R_{out}$ equals $R_{in}$ (i.e., 3000=3000) and the Latency is less than the SLA (i.e., 60 ms<70 ms). Because the conditions of Line 4 are satisfied, the controller 110 proceeds to Line 5 of the control algorithm and increases $R_{in}$ from 3000 to 4000. The increase of $R_{in}$ causes $R_{out}$ to increase to 3500 (i.e., the current configuration of the distributed computing cluster 112 does not have sufficient throughput to keep up with the increased rate of injection of requests, $R_{in}$).

Figure 8:
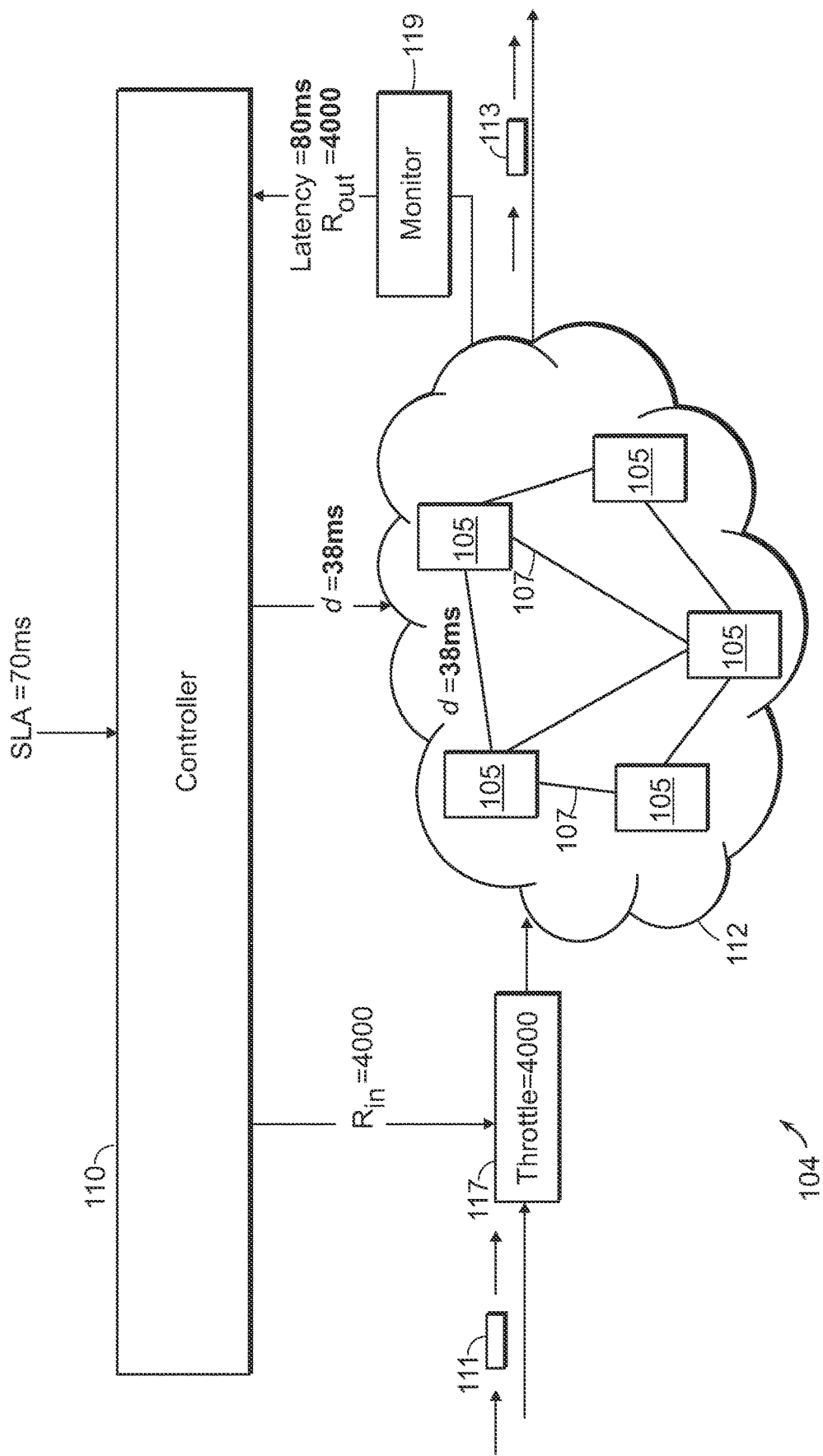
FIG. 8 is a fourth step in the first example of operation of the execution environment of FIG. 2.

Referring to FIG. 8, in a third iteration of the control algorithm, the controller 110 executes the adjust(d) function and increases d to 38 ms, which results in an increase of $R_{out}$ to 4000. After the increase of d, the distributed computing cluster 112 is configured to have sufficient throughput to keep up with the increased rate of injection of requests, $R_{in}$. The increase of d also causes an increase in the Latency of the distributed computing cluster to 80 ms.

Figure 9:
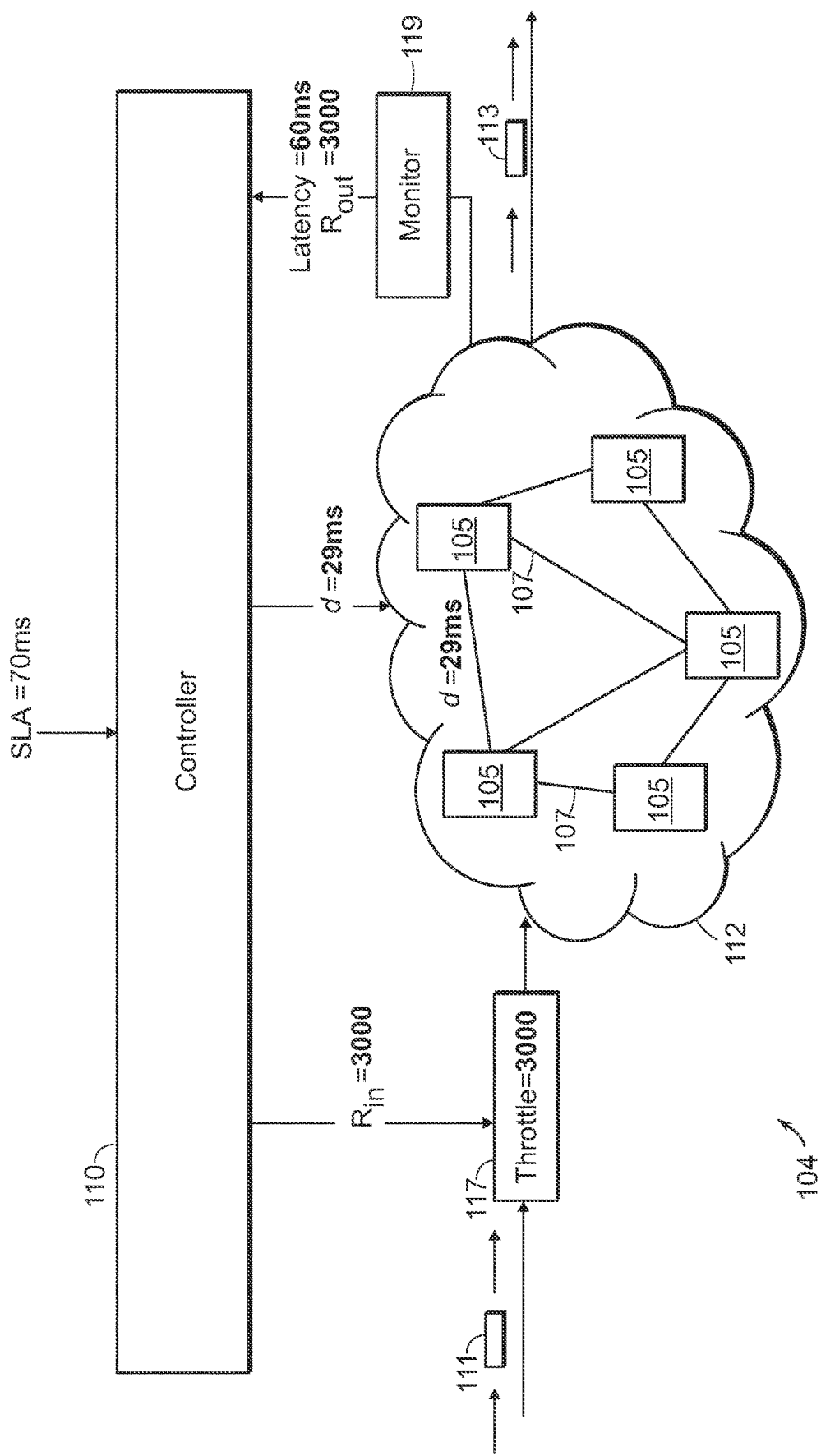
FIG. 9 is a fifth step in the first example of operation of the execution environment of FIG. 2.
Figure 10:
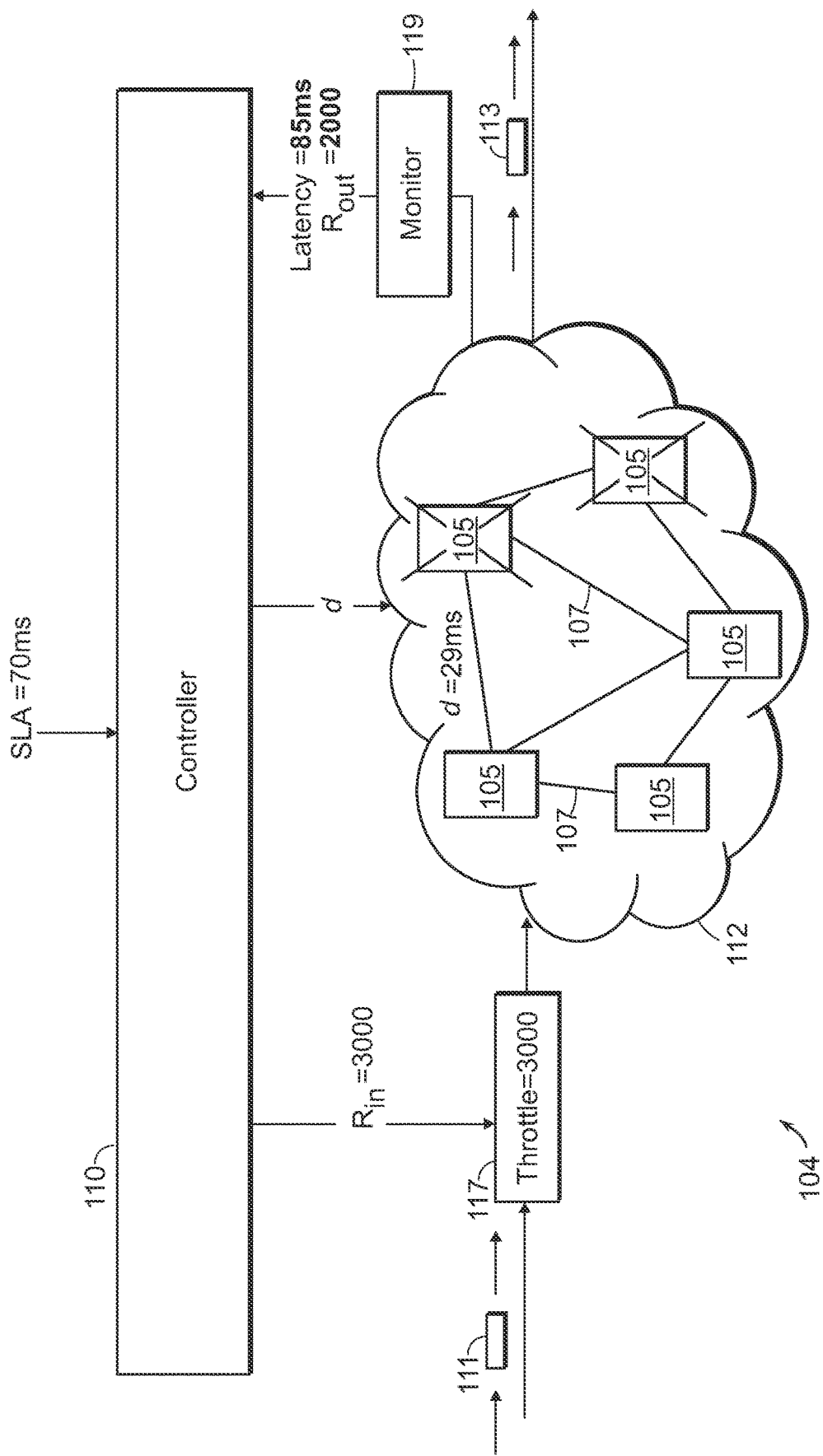
FIG. 10 is an initial state of the execution environment of FIG. 2 in a second example of operation of the execution environment.

Referring to FIG. 9, the third iteration of the control algorithm the controller 110 proceeds to Line 4 of the control algorithm where it determines that $R_{out}$ equals $R_{in}$ (i.e., 3000=3000) and the Latency is greater than the SLA (i.e., 80 ms>70 ms) and therefore violates the SLA. Because the conditions of Line 4 are not satisfied, the controller 110 proceeds to Line 8 of the control algorithm and decreases $R_{in}$ from 4000 to 3000. $R_{out}$ decreases to 300 and the Latency decreases to 60 ms (no longer violating the SLA). In a fourth iteration of the control algorithm, the controller 110 proceeds to Line 3 and executes the adjust(d) function, which reduces d to 29 ms.

The controller 110 continues to execute the algorithm of FIG. 3 as described above to maximize throughput in the distributed computing cluster 112 while ensuring that the service level agreement (SLA) associated with the requests 111 is not violated.

5 Example 2

Referring to FIGS. 10-13, in a second example, the configuration of the distributed computing cluster 112 changes and the controller 110 executes the algorithm of FIG. 3 to adapt to the change in configuration. For example, referring to FIG. 10, two of the computing nodes 105 fail, causing a reduction in computing capability for the distributed computing cluster 112.

With the number of computing nodes 105 in the distributed computing cluster 112 reduced from five to three, the output rate $R_{out}$ is reduced from 3000 to 2000, while the input rate, $R_{in}$ remains at 3000. The Latency increases to 85 ms.

Figure 11:
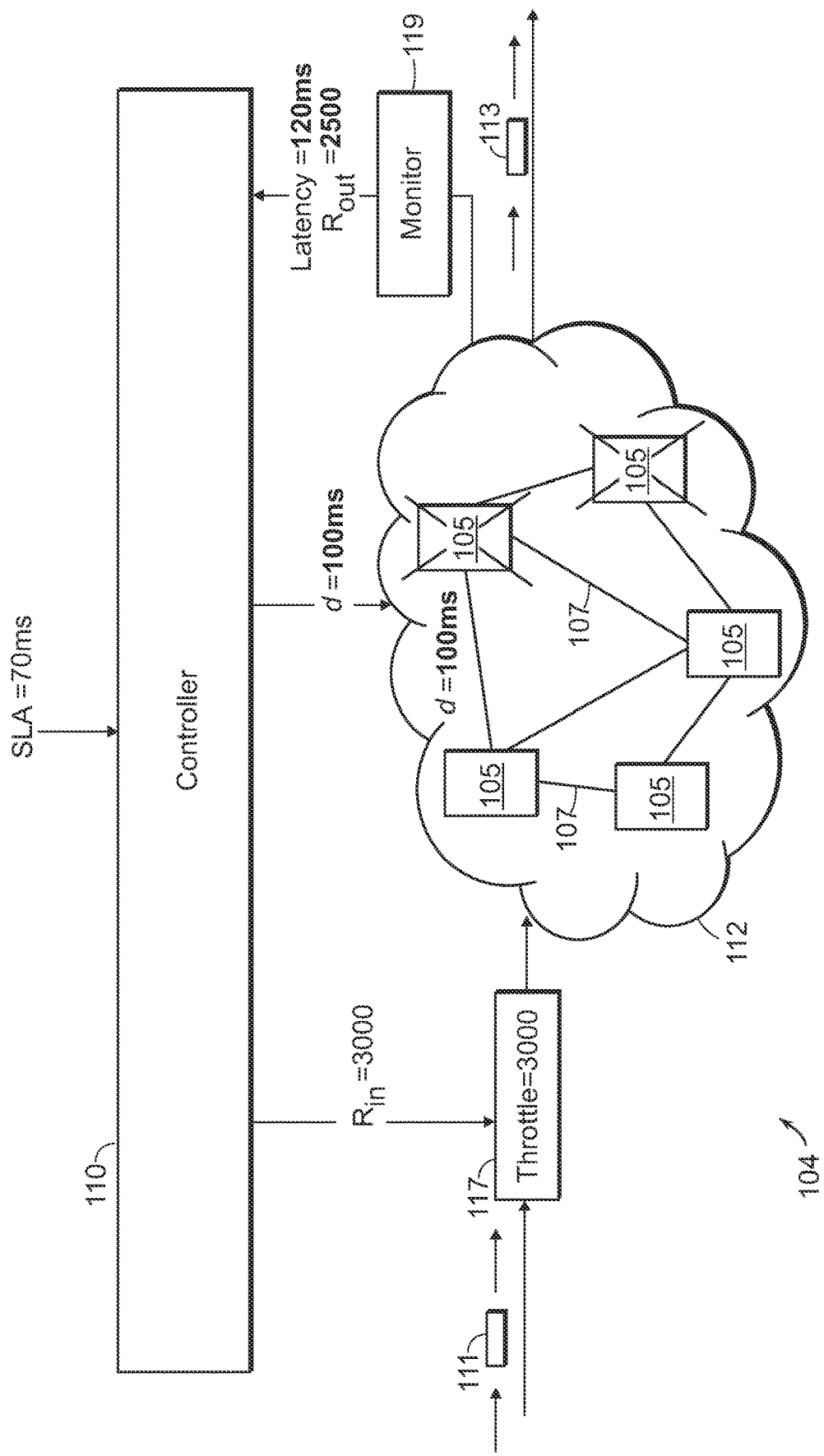
FIG. 11 is a first step in the second example of operation of the execution environment of FIG. 2.

Referring to FIG. 11, the controller 110 executes Line 3 of the control algorithm, executing the adjust(d) function and increases d to 100 ms, which results in an increase of $R_{out}$ to 2500. After the increase of d, the distributed computing cluster 112 still does not have sufficient throughput to keep up with the increased rate of injection of requests, $R_{in}$. The increase of d also causes an increase in the Latency of the distributed computing cluster to 120 ms.

Figure 12:
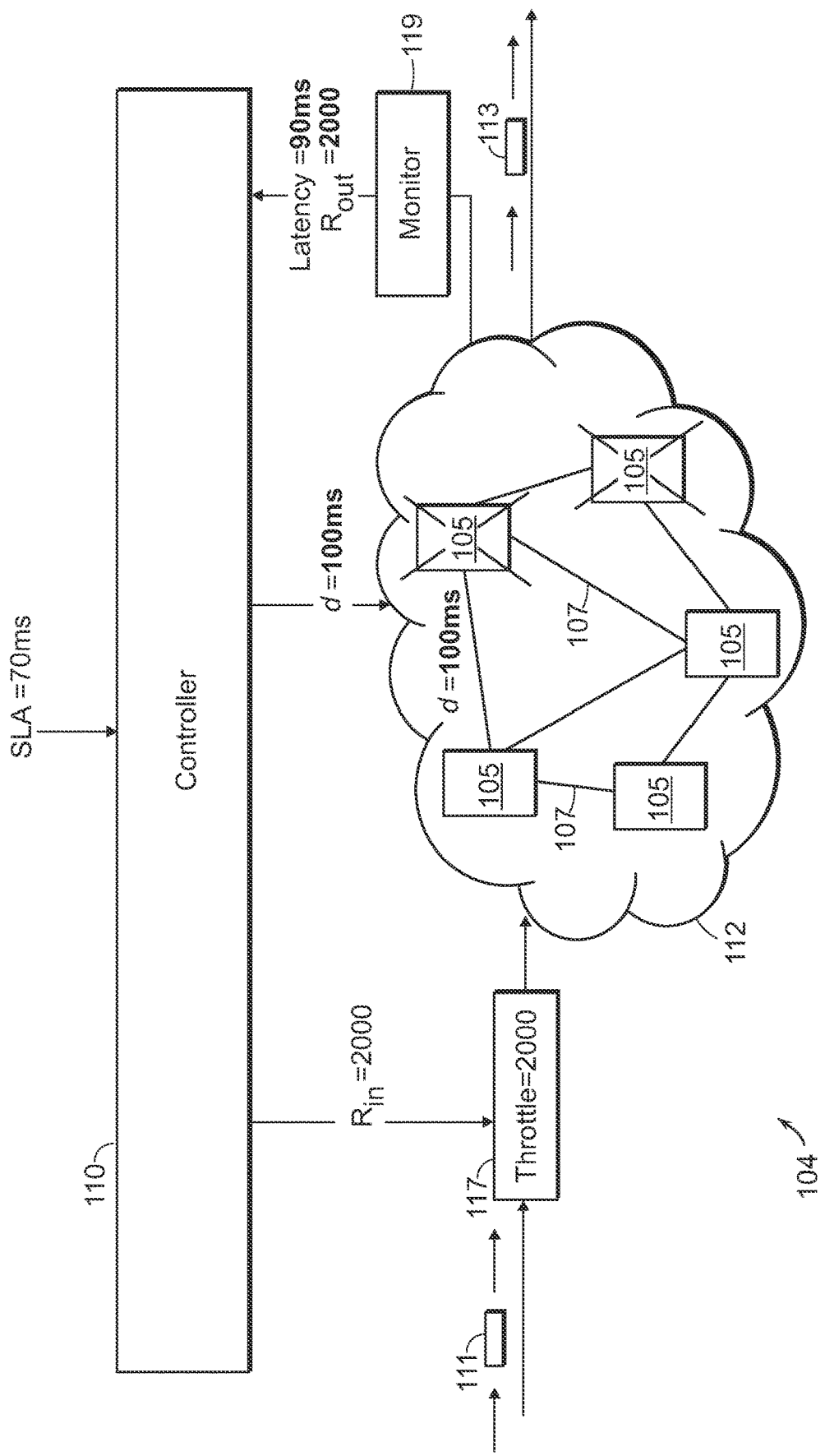
FIG. 12 is a second step in the second example of operation of the execution environment of FIG. 2.

Referring to FIG. 12, the controller 110 proceeds to Line 4 of the control algorithm where it determines that $R_{out}$ does not equal $R_{in}$ (i.e., 2500!=3000) and the Latency is greater than the SLA (i.e., 120 ms>70 ms), violating the SLA. Because the conditions of Line 4 are not satisfied, the controller 110 proceeds to Line 8 of the control algorithm and decreases $R_{in}$ from 3000 to 2000. $R_{out}$ reduces to 2000 (i.e., the current configuration of the distributed computing cluster 112 has sufficient throughput to keep up with the increased rate of injection of requests, $R_{in}$). The Latency decreases to 90 ms.

Figure 13:
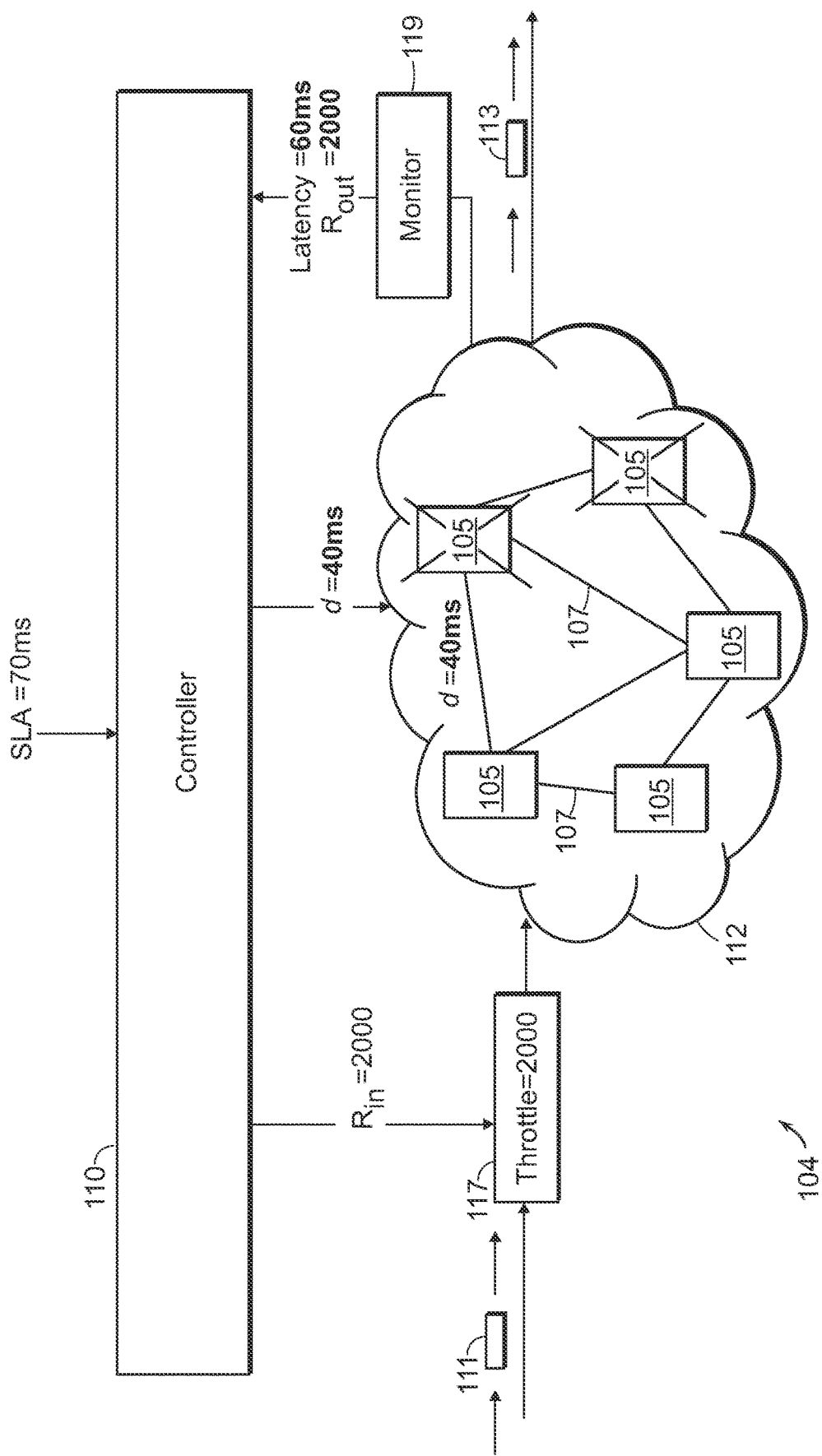
FIG. 13 is a third step in the second example of operation of the execution environment of FIG. 2.

Referring to FIG. 13, in a subsequent iteration of the while loop, the controller 110 executes Line 3 of the control algorithm, executing the adjust(d) function and again arrives at a value of 40 ms for d, which results in $R_{out}$ remaining at 2000. The configuration of the distributed computing cluster of FIG. 13 has sufficient throughput to keep up with the decreased rate of injection of requests, $R_{in}$. The Latency of the distributed computing cluster is reduced to 60 ms.

In the configuration of FIG. 13, the controller 110 has adapted the system to maximize throughput in the new configuration of the distributed computing cluster 112 while ensuring that the service level agreement (SLA) associated with the requests 111 is not violated.

6 Alternatives

In the description of FIGS. 6 to 13, the controller 110 has adapted the system to maximize throughput in the new configuration of the distributed computing cluster 112 while ensuring that the service level agreement (SLA) associated with the requests 111 is not violated. However, instead of maximizing of the throughput, the throughput may be merely controlled, such that no further increase of the throughput is performed when determining that service level arrangement is not violated and when determining that $R_{in}$ and $R_{out}$ being equal, indicating that the distributed computing cluster 112 has sufficient throughput to keep up with the rate of injection of requests, $R_{in}$. (e.g. in the scenario illustrated in FIG. 5).

Also, the control algorithm in FIG. 3 is merely exemplary and adjusts $R_{in}$ and d with a coarse granularity, but it is noted that, in some examples, the control algorithm uses finer granularity adjustments and, in some cases uses a variable granularity for adjusting $R_{in}$ and d.

The adjust(d) function described above can be implemented using any one of a number of known optimization techniques (e.g., gradient descent or stochastic optimization techniques).

While the examples described above illustrate injection of requests from only a single external component (e.g., a call cluster component) interacting with the distributed data cluster, it is likely that several external components will be interacting with the distributed data cluster at the same time. In such cases, the controller monitors the latencies and throughputs of many or all of the external components and balances their access to the resources of the distributed data cluster to ensure that throughput is maximized, and the SLAs of the requests from the external components are satisfied.

In some examples, input data that arrives at the external component (e.g., at a call cluster component) is prioritized and the requests are injected according to the priority level.

In some examples, latency is measured at the service request level (e.g., remote procedure call latency) or simply by the time it takes between injecting a request into the distributed data cluster and receiving a response.

In some examples, throughput is measured by monitoring CPU load or a number of messages "in flight."

In some examples, each computing node maintains a timer and decides when to transmit messages over the interconnect based on the timer and the communication delay, d. In other examples, a centralized clock periodically distributes a trigger signal, where the period is defined as the communication delay, d. The trigger signal, when received at the computing nodes, causes the computing nodes to transmit messages.

While not shown in the figures, in some examples, the output of the throttle 117 is fed through the monitor 119 to assist in determining the processing latency of the distributed computing cluster 112.

As is mentioned above, the distributed computing cluster interacts with one or more external components (sometimes referred to as "call cluster components" or "interface components). The external components may be associated with corresponding data processing procedures. In some examples, an external component receives input data for processing according to its corresponding data processing procedure. The external component forms a processing request using the input data and provides the processing request into the distributed computing cluster. The distributed computing cluster processes the request using the control scheme described above and generates an output. The output is provided back to the external component. The external component processes the output to generate output data, which it transmits to one more downstream components.

7 Implementations

The approaches described above can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be stored in non-transitory form, such as being embodied in a volatile or non-volatile storage medium, or any other non-transitory medium, using a physical property of the medium (e.g., surface pits and lands, magnetic domains, or electrical charge) for a period of time (e.g., the time between refresh periods of a dynamic memory device such as a dynamic RAM). In preparation for loading the instructions, the software may be provided on a tangible, non-transitory medium, such as a CD-ROM or other computer-readable medium (e.g., readable by a general or special purpose computing system or device), or may be delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A computing system (104) including:
   a distributed computing cluster (112) including:
   a plurality of computing nodes (105) interconnected by an interconnect network (107) over which the computing nodes of the plurality of computing nodes communicate with each other by passing messages, each of at least some of the computing nodes being configured with a first parameter governing transmissions of messages by the computing node over the interconnect network, the first parameter specifying a time duration between transmission of messages by the computing node,
   wherein the at least some computing nodes are configured to accumulate messages for transmission as a group of messages according to the first parameter, the accumulation at each computing node of the at least some computing nodes occurring during the time duration between transmissions specified by the first parameter, and
   a monitor for receiving data processing characteristics including a computational throughput of the distributed computing cluster and a computational latency of the distributed computing cluster;
   a rate limiter for limiting the rate of injections of computing requests from outside the distributed computing cluster into the distributed computing cluster according to a second parameter specifying the rate of injection of computing requests; and
   a controller (110) configured to receive at least one predetermined service level requirement for the distributed computing cluster and to jointly control a value of the second parameter and a value of the first parameter based on the processing latency and the computational throughput to control the computational throughput of the distributed computing cluster while complying with the at least one service level requirement for the distributed computing cluster.

2. The computing system of claim 1 wherein each service level requirement of the one or more service level requirements specifies a maximum allowable time difference between injecting a computing request into the distributed computing cluster and receiving a response to the injected computing request from the distributed computing cluster.

3. The computing system of claim 1 wherein the monitor (119) is configured to observe a rate of output of the distributed computing cluster and a processing latency of the distributed computing system.

4. The computing system of claim 3 wherein the observed processing latency is measured by determining a time difference between injecting a computing request into the distributed computing cluster and receiving a response to the injected computing request from the distributed computing cluster.

5. The computing system of claim 3 wherein requests injected into the distributed computing cluster and results output by the distributed computing cluster pass through the monitor.

6. The computing system of claim 3 wherein the computational throughput is observed by measuring, by the monitor, a rate of data elements outputted by the cluster.

7. The computing system of claim 3 wherein the controller is configured to process the observed computational throughput of the distributed computing cluster and the observed processing latency to adjust the value of the second parameter and the value of the first parameter.

8. The computing system of claim 7 wherein the controller repeatedly processes the observed computational throughput of the distributed computing cluster and the observed processing latency to adjust the value of the second parameter and the value of the first parameter while the distributed computing cluster is processing injected computing requests.

9. The computing system of claim 7 wherein the controller implements a feedback loop with the distributed computing cluster to process the observed computational throughput of the distributed computing cluster and the observed processing latency to adjust the value of the second parameter and the value of the first parameter.

10. The computing system of claim 1 wherein the controller uses an optimization algorithm to control the value of the first and/or second parameter to maximize the computational throughput of the distributed computing cluster while complying with the at least one service level requirement.

11. The system of claim 1 wherein the first parameter includes a delay parameter governing a minimum time interval between transmission of messages by the computing node over the interconnect network.

12. The system of claim 11 wherein the at least some computing nodes are configured to accumulate messages for transmission as a group of messages during the minimum time interval.

13. The system of claim 1 wherein controlling the computational throughput of the distributed computing cluster while complying with the at least one service level requirements includes the maximizing a computational throughput of the distributed computing cluster without violating any of the at least one service level requirements.

14. The system of claim 1 wherein the first parameter governs a number of messages accumulated between transmissions of messages by the computing node over the interconnect network.

15. The computing system of claim 1 further including one or more interface components, each configured to receive input data, inject computing requests into the distributed computing cluster for processing the input data, receive processing results from the distributed computing cluster, and generate output data from the processing results, the interface component being configured to limit a rate of injection of computing requests into the distributed computing system according to the second parameter.

16. The computing system of claim 15 wherein at least some of the one or more interface components execute on a client system (106) separate from systems on which the distributed computing cluster executes.

17. The computing system of claim 15 wherein at least some of the received input data is associated with priority levels, and the one or more interface components are configured to manage injection of the input data into the distributed data cluster according to the priority levels.

18. A method including:
limiting, using a rate limiter, a rate of injections of computing requests from outside a distributed computing cluster into the distributed computing cluster according to a second parameter specifying the rate of injection of computing requests, wherein the distributed computing system includes:
a plurality of computing nodes (105) interconnected by an interconnect network (107) over which the computing nodes of the plurality of computing nodes communicate with each other by passing messages, each of at least some of the computing nodes being configured with a first parameter governing transmissions of messages by the computing node over the interconnect network, the first parameter specifying a time duration between transmission of messages by the computing node,
accumulating, at the at least some computing nodes, messages for transmission as a group of messages according to the first parameter, the accumulation at each computing node of the at least some computing nodes occurring during the time duration between transmissions specified by the first parameter,
receiving, at a controller (115), at least one predetermined service level requirement for the distributed computing cluster,
receiving, at a monitor, data processing characteristics including a computational throughput of the distributed computing cluster and a computational latency of the distributed computing cluster, and
jointly controlling, using the controller, a value of the second parameter and a value of the first parameter based on the processing latency and the computational throughput to control the computational throughput of the distributed computing cluster while complying with the at least one service level requirement for the distributed computing cluster.

19. A computer-readable medium storing software in a non-transitory form, the software including instructions for causing a computing system to:
limit, using a rate limiter, a rate of injection of computing requests from outside a distributed computing cluster into the distributed computing cluster according to a second parameter specifying the rate of injection of computing requests, wherein the distributed computing system includes:
a plurality of computing nodes (105) interconnected by an interconnect network (107) over which the computing nodes of the plurality of computing nodes communicate with each other by passing messages, each of at least some of the computing nodes being configured with a first parameter governing transmissions of messages by the computing node over the interconnect network, the first parameter specifying a time duration between transmission of messages by the computing node,
accumulate, at the at least some computing nodes, messages for transmission as a group of messages according to the first parameter, the accumulation at each computing node of the at least some computing nodes occurring during the time duration between transmissions specified by the first parameter,
receive, at a controller (115), at least one predetermined service level requirement for the distributed computing cluster,
receive, at a monitor, data processing characteristics including a computational throughput of the distributed computing cluster and a computational latency of the distributed computing cluster, and
jointly control, using the controller, a value of the second parameter and a value of the first parameter based on the processing latency and the computational throughput to control the computational throughput of the distributed computing cluster while complying with the at least one service level requirement for the distributed computing cluster.

20. A computing system including:
means for limiting a rate of injection of computing requests from outside a distributed computing cluster into the distributed computing cluster according to a second parameter specifying the rate of injection of computing requests, wherein the distributed computing system includes:
a plurality of computing nodes (105) interconnected by an interconnect network (107) over which the computing nodes of the plurality of computing nodes communicate with each other by passing messages, each of at least some of the computing nodes being configured with a first parameter governing transmissions of messages by the computing node over the interconnect network, the first parameter specifying a time duration between transmission of messages by the computing node,
means for accumulating, at the at least some computing nodes, messages for transmission as a group of messages according to the first parameter, the accumulation at each computing node of the at least some computing nodes occurring during the time duration between transmissions specified by the first parameter,
means for receiving, at a controller (115), at least one predetermined service level agreement for the distributed computing cluster,
means for receiving data processing characteristics including a computational throughput of the distributed computing cluster and a computational latency of the distributed computing cluster, and
means for jointly controlling, using the controller, a value of the second parameter and a value of the first parameter based on the processing latency and the computational throughput to control the computational throughput of the distributed computing cluster while complying with the at least one service level requirement for the distributed computing cluster.

21. A computing system (104) including:

a distributed computing cluster (112) including:
- a plurality of computing nodes (105) interconnected by an interconnect network (107) over which the computing nodes of the plurality of computing nodes communicate with each other by passing messages, each of at least some of the computing nodes being configured with a first parameter governing transmissions of messages by the computing node over the interconnect network, the first parameter specifying a time duration between transmission of messages by the computing node,
- wherein the at least some computing nodes are configured to accumulate messages for transmission as a group of messages according to the first parameter, the accumulation at each computing node of the at least some computing nodes occurring during the time duration between transmissions specified by the first parameter, and wherein the computing system is configured to limit a rate of injections of computing requests into the distributed computing cluster according to a second parameter specifying the rate of injection of computing requests; and the computing system further includes a controller (110) configured to receive at least one predetermined service level requirement and to jointly control a value of the second parameter and a value of the first parameter based on a processing latency of the distributed computing cluster and a computational throughput of the distributed computing cluster to control the computational throughput of the distributed computing cluster while complying with the at least one service level requirement;

wherein the at least some computing nodes configured to accumulate messages for transmission as a group of messages according to the first parameter are configured to form a single network message including the group of messages and to transmit the single network message.

* * * * *